US009555758B2

United States Patent
Le Merrer et al.

(10) Patent No.: US 9,555,758 B2
(45) Date of Patent: Jan. 31, 2017

(54) VEHICLE SAFETY SYSTEM

(71) Applicants: Autoliv Development AB, Vårgårda (SE); Volvo Car Corporation, Göteborg (SE)

(72) Inventors: Yann Le Merrer, Paris (FR); Arnaud Devavry, Cergy (FR); Pär Nilsson, Mölndal (SE)

(73) Assignees: Autoliv Development AB, Vårgårda (SE); Volvo Car Corporation, Göteborg (SE)

( * ) Notice: Subject to any disclaimer, the term of this patent is extended or adjusted under 35 U.S.C. 154(b) by 33 days.

(21) Appl. No.: 14/547,275

(22) Filed: Nov. 19, 2014

(65) Prior Publication Data

US 2015/0274105 A1   Oct. 1, 2015

(30) Foreign Application Priority Data

Oct. 29, 2013 (GB) .................................. 1319081.4

(51) Int. Cl.
| | | |
|---|---|---|
| *B60R 21/00* | (2006.01) | |
| *B60R 21/01* | (2006.01) | |
| *B60R 21/013* | (2006.01) | |
| *B60K 28/14* | (2006.01) | |
| *B60W 30/085* | (2012.01) | |

(Continued)

(52) U.S. Cl.
CPC ............... *B60R 21/01* (2013.01); *B60K 28/14* (2013.01); *B60R 21/013* (2013.01); *B60W 30/085* (2013.01); *B60W 40/10* (2013.01); *B60R 21/0132* (2013.01); *B60R 2021/01304* (2013.01);

(Continued)

(58) Field of Classification Search
None
See application file for complete search history.

(56) References Cited

U.S. PATENT DOCUMENTS

| | | |
|---|---|---|
| 6,438,463 B1 | 8/2002 | Tobaru et al. |
| 6,904,350 B2 | 6/2005 | Lu et al. |

(Continued)

FOREIGN PATENT DOCUMENTS

| | | |
|---|---|---|
| DE | 10 2005 012 283 A1 | 9/2006 |
| DE | 10 2007 035 504 A1 | 1/2009 |

(Continued)

OTHER PUBLICATIONS

Intellectual Property Office, United Kingdom, Search Report of GB Patent Application No. 1319081.4, Dated May 9, 2014, two pages.

*Primary Examiner* — John R Olszewski
*Assistant Examiner* — James M McPherson
(74) *Attorney, Agent, or Firm* — Brinks Gilson & Lione

(57) ABSTRACT

A safety arrangement for a vehicle. The safety arrangement has a control unit; one or more sensors, a road detection arrangement; and one or more vehicle safety systems. The control unit processes the signals from the sensors and determines whether the vehicle is travelling over rough terrain, entering a ditch-like feature, or is airborne. The control unit will activate one or more of the vehicle safety systems if it is determined that the vehicle is travelling over rough terrain, entering a ditch-like feature, or is airborne. Signals, or derived quantities, from the sensors are compared against a threshold to determine whether to activate a vehicle safety system. A first threshold level is used if the vehicle has not or is not likely to leave the road, and a second threshold level is used if the vehicle has or is likely to leave the road.

12 Claims, 2 Drawing Sheets

(51) Int. Cl.
  *B60W 40/10* (2012.01)
  *B60R 21/0132* (2006.01)
(52) U.S. Cl.
  CPC .... *B60W 2420/42* (2013.01); *B60W 2420/905* (2013.01); *B60W 2550/147* (2013.01)

(56) References Cited

U.S. PATENT DOCUMENTS

| | | | |
|---|---|---|---|
| 2002/0128795 A1* | 9/2002 | Schiffmann | B60R 21/0132 702/151 |
| 2003/0160369 A1* | 8/2003 | LaPlante | B60G 17/08 267/136 |
| 2006/0064218 A1 | 3/2006 | Subbian et al. | |
| 2007/0185623 A1 | 8/2007 | Chen et al. | |
| 2008/0262680 A1* | 10/2008 | Yeh | B60R 21/0132 701/45 |
| 2011/0106458 A1 | 5/2011 | Shiozawa et al. | |
| 2015/0039155 A1* | 2/2015 | Doerr | B60R 16/0233 701/1 |

FOREIGN PATENT DOCUMENTS

| | | |
|---|---|---|
| EP | 2 520 472 A2 | 11/2012 |
| WO | 2013/162446 A1 | 10/2013 |

\* cited by examiner

FIG 5
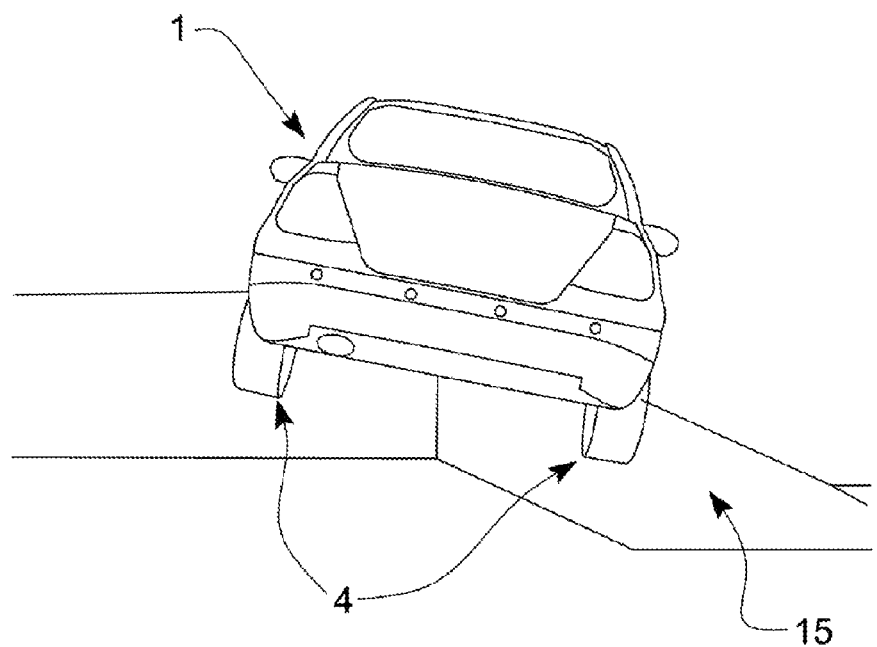
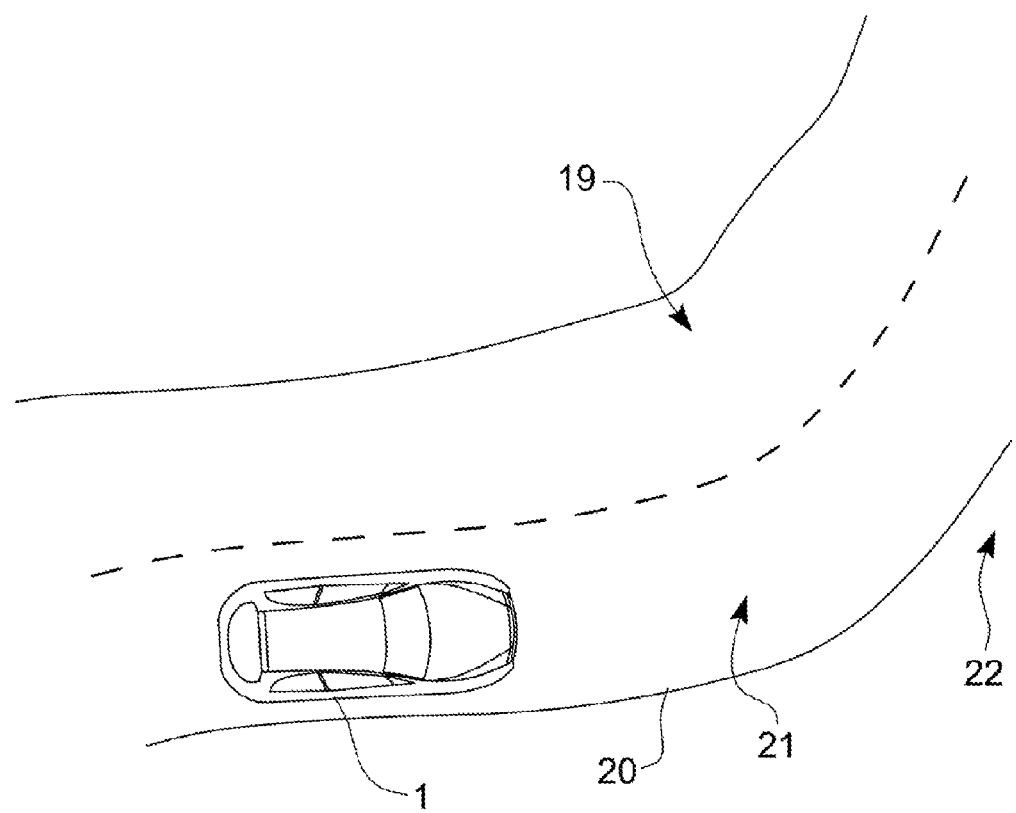
FIG 6

VEHICLE SAFETY SYSTEM

CROSS REFERENCE TO RELATED APPLICATION

This application claims priority to United Kingdom patent application number 1319081.4, filed on Oct. 29, 2013.

DESCRIPTION OF INVENTION

The present invention relates to a vehicle safety system, and in particular a system for determining when the vehicle has encountered an uneven driving surface, particularly in a road departure scenario, that may cause occupants of the vehicle to be moved or jolted out of their regular positions, and for assisting in protecting the occupants of the vehicle if this occurs.

It has previously been proposed to determine whether one or more wheels of a vehicle are no longer in contact with the ground. U.S. Pat. No. 6,904,350 discloses an arrangement in which the signals from inertial sensors are used to make a determination as to whether two wheels on the same side of a vehicle have lost contact with the ground, to assist in the early detection of a roll-over situation. U.S. Patent Publication No. 2007/0185623 discloses an arrangement in which suspension sensors are provided, to gauge from the behaviour of the suspension systems associated with a vehicle's wheels and whether the wheels are still in contact with the ground. This document is also concerned with the detection of roll-over situations.

In systems of this type it is often difficult to discriminate effectively, based on signals from the vehicle's sensors, between situations that are likely to require the activation of safety systems to protect occupants of the vehicle and those that are not.

It is an object of the present invention to provide an improved vehicle safety system of this type.

Accordingly, one aspect of the present invention provides a safety arrangement for a vehicle, the arrangement comprising: a control unit; one or more vehicle sensors, the sensors being connected to the control unit so the control unit receives output signals from the sensors; a road detection arrangement to detect a surface or an edge of a road in the vicinity of the vehicle and determine whether the vehicle has left the road and is being driven over a surrounding non-road surface, or is likely to do so; and one or more vehicle safety systems which may be activated by the control unit, wherein: the control unit is configured to process the signals received from the sensors and to determine whether the vehicle is travelling over rough terrain, or is entering a ditch-like feature, or the vehicle is airborne; the control unit is configured to activate the one or more vehicle safety systems if it is determined from the signals received from the sensors that the vehicle is travelling over rough terrain, or is entering a ditch-like feature, or the vehicle is airborne; and signals from the sensors, or one or more quantities derived or calculated from signals from the sensors, are compared against at least one threshold to determine whether to activate the one or more vehicle safety systems, wherein the threshold is set at a first level if it is determined by the road detection arrangement that the vehicle has not left the road, and is not likely to do so, and at a second level if it is determined that the vehicle has left the road, or is likely to do so.

Advantageously, the vehicle has a front wheel arrangement having one or more wheels and a rear wheel arrangement having one or more wheels, and the control unit is configured to determine that the vehicle is airborne if it is determined that at least one of the wheel arrangements is not in contact with the surface over which the vehicle is being driven.

Preferably, the sensors are inertial sensors.

Conveniently, when the second level of the threshold is applied, the one or

Preferably, the road detection arrangement comprises a positioning system.

Advantageously, the one or more vehicle safety systems comprise one or more air-bags and/or a seatbelt pretensioner.

Another aspect of the present invention provides a vehicle comprising a safety arrangement according to any of the above.

In order that the invention may be more readily understood, embodiments thereof will now be described, by way of example, with reference to the accompanying drawings, in which:

BRIEF DESCRIPTION OF THE DRAWINGS

FIG. 5 shows the vehicle entering an alternative ditch-like feature;
and
FIG. 6 shows the vehicle approaching a bend in a road.

DETAILED DESCRIPTION OF THE INVENTION

Figure 1:
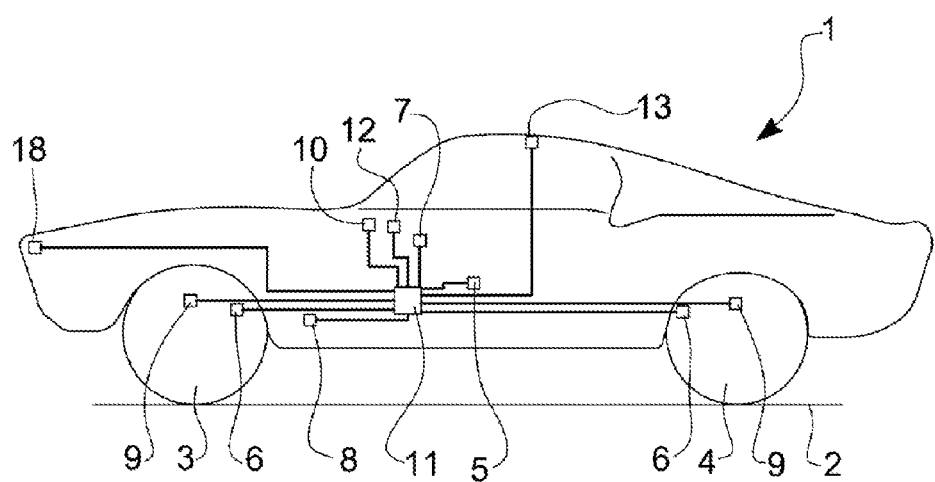
FIG. 1 shows a vehicle under normal driving conditions.

Referring firstly to FIG. 1, a vehicle 1 is shown in normal driving conditions on a flat surface 2, which may (for example) be a road surface, with both the front wheels 3 and the rear wheels 4 of the vehicle 1 in contact with the surface 2.

The vehicle 1 is equipped with inertial sensors 5, at least some of which are preferably located at or near the centre of gravity of the vehicle 1. However, the inertial sensors 5 may be distributed throughout the vehicle 1 and placed in any suitable locations, and indeed in some embodiments none of the inertial sensors 5 may be located at or near the vehicle's centre of gravity.

As used in this specification, inertial sensors include (but are not limited to) yaw rate sensors, roll rate sensors, longitudinal acceleration sensors, lateral acceleration sensors, vertical acceleration sensors and pitch rate sensors.

Wheel rotation sensors 6 are also provided. The wheel rotation sensors 6 detect the rate of rotation (and/or rate of change of rate of rotation) of the front wheels 3, the rear wheels 4, or both. The rotation of the wheels 3,4 on the left and right sides of the vehicle 1 may be measured independently.

The vehicle 1 includes positioning sensors 7. These may include, for example, a GPS system or the like to determine the vehicle's position on the surface of the Earth or with respect to fixed reference points.

Pedal sensors 8 are provided. These sensors 8 may detect whether the accelerator, brake and/or clutch pedals of the vehicle 1 are depressed, and may also provide information as to the amount by which the respective pedals are depressed.

The vehicle 1 includes suspension force sensors 9. These sensors detect the force applied to the suspension of the vehicle, and respective sensors 9 may be provided for the front and rear wheels 3, 4, or even for each of the four wheels independently.

A steering sensor 10 is also provided. This sensor 10 determines the extent to which a steering wheel of the vehicle 1, and/or the wheels 3, 4 of the vehicle 1 that are involved in steering, are turned.

The vehicle 1 also includes one or more camera systems 18, which are arranged to gather images of the surroundings of the vehicle 1. The cameras, or each camera, of the system may gather light in the visible spectrum, in the infra-red (IR) portion of the spectrum, or one or more other types of light.

Preferably, the at least one camera system 18 is forward-oriented, to gather images of the region ahead of the vehicle 1. Left and right camera systems are also preferably provided to gather images to the left and right of the vehicle 1. A rear camera system may also be provided.

As well as, or instead of, camera systems, the vehicle 1 may be equipped with one or more reflected radiation systems, such as radar or lidar systems. Such systems emit radiation which is reflected from objects and returned to the reflected radiation system, where it is detected. Systems of this type can determine the distance to objects in the region of the vehicle, and can also gather information regarding the shape of objects, or of the surface/terrain around the vehicle.

A control unit 11, comprising one or more on-board processors, is provided. Although the control unit 11 is shown as one component, the processors making up the control unit 11 may be spread over several locations within the vehicle 1. The control unit 11 is connected to receive output signals from the inertial sensors 5 and from the camera systems/reflected radiation systems 18.

The vehicle 1 includes safety systems to protect vehicle occupants. These safety systems may include various air-bags, such as a front air-bag 12 and/or an inflatable curtain (IC)-type side air-bag 13, a reversible (e.g. motorised) seatbelt pretensioner, an irreversible (e.g. "pyrotechnic") seatbelt pretensioner, reversible knee padding elements, door or roof window closing systems, reset systems for the seat backs, the steering wheel and/or the steering column, or systems to alter the stiffness of the vehicle's suspension.

Figure 2:
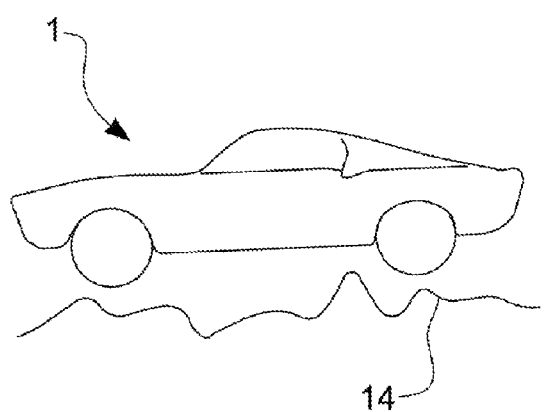
FIG. 2 shows the vehicle travelling over rough terrain.

Embodiments of the present invention allow the control unit 11 to determine, through signals received from the vehicle sensors 5, whether the vehicle 1 is experiencing motion that could be indicative of the vehicle 1 being involved in a road departure event. In a first type of event, the vehicle 1 travels along rough terrain 14, as shown schematically in FIG. 2. When this occurs the vehicle 1 may experience extreme roll and pitch motion, for instance as may be experienced when driving a vehicle at speed over uneven non-road terrain.

Figure 3:
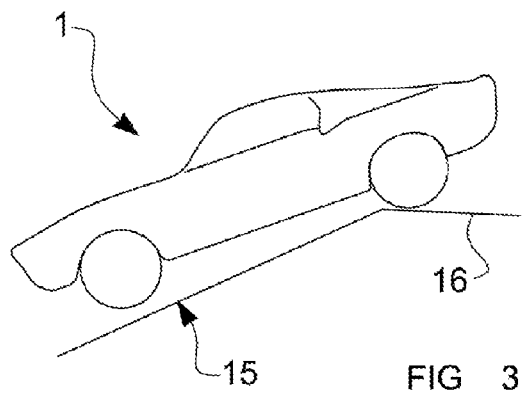
FIG. 3 shows the vehicle entering a ditch-like feature.

A second type of event involves the vehicle 1 entering a ditch 15. This is defined as a situation in which the vehicle 1 drives down onto a banked ditch 15, or ditch-like feature, from a flat section of road or other terrain 16, as shown schematically in FIG. 3.

In a third type of situation, the vehicle 1 is airborne. This is defined as being the situation where at least the front wheels 3 of the vehicle 1 are raised above, and are not in contact with, the ground 17, as shown schematically in FIG. 4.

In each type of situation, it can be important to activate vehicle safety systems to protect the occupant(s) of the vehicle 1. However, the systems that should be activated may vary depending upon the situation, and it is usually not desirable to activate safety systems that are not needed, as this can entail an unnecessary risk of injury or discomfort to the vehicle occupant(s). It is therefore important to be able to distinguish reliably between the various types of event.

It is also important to be able to distinguish between situations in which the occupant(s) of the vehicle 1 are exposed to a high risk of injury, and situations in which the level of risk is low. In particular, when driving along a rough, bumpy or poorly-maintained road, significant jolting and other motion may be experienced by the vehicle 1. However, while the vehicle 1 remains on the road, the risk of injury to the occupant(s) remains relatively low.

The three potential road departure scenarios mentioned above will be discussed in turn.

In reaching a determination as to whether any of the three situations may be occurring, signals from the sensors are analysed.

Firstly, to determine whether the vehicle 1 may be driving over rough terrain, the signals from roll and pitch inertia sensors 5 may be analysed. As discussed above, if the vehicle 1 is driving over rough terrain 14 then the vehicle 1 is likely to experience substantial roll and pitch motion. A determination may therefore be made that the vehicle 1 is driving over rough terrain if the amplitude of the roll or pitch experienced by the vehicle 1 exceeds a predetermined threshold, or if the rate of change of roll or pitch (i.e. acceleration around the roll or pitch axis) exceeds a predetermined threshold.

Alternatively, the vertical acceleration of the vehicle 1, as determined by a vertical acceleration sensor 5, may be analysed—if the rate of vertical acceleration changes rapidly this may be indicative of the vehicle 1 jolting up and down, and thus indicative of the vehicle 1 driving over rough terrain 14. The lateral and/or longitudinal acceleration of the vehicle may also be considered, with signals from lateral and longitudinal acceleration sensors 5 being analysed to determine whether the vehicle 1 is being jolted in the left/right or forward/backwards directions.

As a further alternative, the force experienced by the suspension sensors 9 may be analysed. If the force experienced by the suspension sensors 9 exceeds a threshold value, or varies rapidly for a sufficiently long period, this may also be indicative that the vehicle 1 is being jolted up and down by rough terrain 14.

Secondly, to determine whether the vehicle 1 has encountered a ditch 15, signals from a pitch inertia sensor 5 and/or a roll inertia sensor 5 may be analysed. If the vehicle 1 pitches forwardly (i.e. rotates so that the nose of the vehicle 1 dips downwardly) by more than a predetermined threshold (for instance, 5° or 10°) then it may be determined that the vehicle 1 has entered a ditch 15 in a straightforward fashion, i.e. driven generally directly over the edge of a ditch.

Alternatively, the vehicle 1 may enter a ditch 15 at a relatively small approach angle. In this case it is likely that the front wheel on one side of the vehicle 1 will dip downwardly, and at the same time that the vehicle 1 will rotate about its roll axis. To determine whether this event is occurring, signals from the pitch inertia sensor 5 may be analysed (although the rate of forward pitch would not be expected to be as great as for a straightforward ditch entry), in conjunction with signals from the roll inertia sensor 5. If both forward pitch and roll occur simultaneously, it may be determined that the vehicle 1 has entered a ditch 15 at an oblique angle. If the vehicle is not equipped with a pitch sensor, then signals from a roll sensor 5 only may be used in determining whether this situation is occurring.

As a further possibility, the vehicle 1 may enter a ditch in such a manner that both wheels on one side of the vehicle 1 enter the ditch 15 at substantially the same time, as shown in FIG. 5. If this occurs, the vehicle 1 will roll relatively rapidly to one side, although as this occurs there may be little or no pitch of the vehicle 1. In this case, signals from the roll inertia sensor 5 may be analysed, and if the rate of roll is above a threshold it may be determined that one side of the vehicle 1 has entered a ditch.

It will be appreciated that, if a road surface includes a ditch-like feature having a sharp or sudden edge, the motion experienced by the vehicle 1 when driving along the road will be similar to that experienced when a vehicle enters a ditch in an off-road situation.

Other indications that the vehicle 1 has entered a ditch or ditch-like feature 15 may include the force experienced by front suspension sensors 9 being significantly greater than the force experienced by rear suspension sensors 9 (or, alternatively, that the force experienced by the suspension sensors on one side of the vehicle 1 being significantly greater than the force experienced by the suspension sensors on the other side of the vehicle 1), and also indications that the vehicle 1 is driving over relatively rough terrain 14 (see above), as the surface of a ditch 15 is likely to be less smooth than the surface of a paved road.

Thirdly, whether the vehicle 1 is airborne may be analysed as follows.

Figure 4:
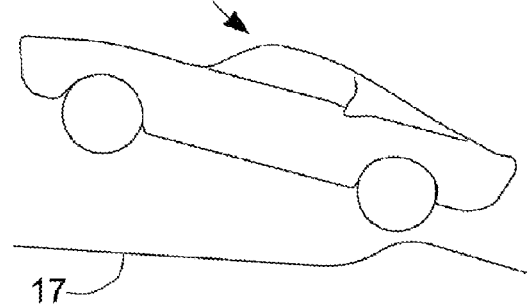
FIG. 4 shows the vehicle when airborne.

When the vehicle 1 is at rest, or is driving under normal conditions as shown in FIG. 1, the vertical acceleration sensor will register a default, "zero" setting, resulting from gravitational forces acting on the vertical acceleration sensor. However, when the front wheels 3 of the vehicle leave the road surface 17, as shown in FIG. 4, the vehicle 1 will effectively be in freefall and the vertical acceleration sensor will register a change in acceleration equivalent to the vehicle 1 experiencing a downward acceleration.

During the course of normal driving, the vehicle 1 will of course experience upward and downward acceleration as the vehicle 1 negotiates slopes, hills, uneven surfaces, speed bumps and the like. However, vertical acceleration beyond a threshold has been found to be a relatively reliable indicator that the vehicle 1 has left the surface 17 and has become airborne. In the situation shown in FIG. 4, the sensed vertical acceleration will change from around 10 m/s$^2$ to around zero, following removal of the reaction force arising from gravity. In one embodiment a change of around 10 m/s$^2$ may be used as the vertical acceleration threshold. However, in other situations where the vehicle 1 becomes airborne the change may be less, either because only some of the wheels 3, 4 of the vehicle 1 have left the ground, or because the sensed vertical acceleration before the vehicle 1 became airborne was less than 10 m/s$^2$, for instance if the vehicle 1 was travelling over the brow of a hill. A lesser threshold, for instance 9 m/s$^2$, 8 m/s$^2$ or 7 m/s$^2$, may therefore be used.

In addition to the above, even relatively smooth road surfaces will have bumps, irregularities and texture. The vertical acceleration experienced by the vehicle 1 during normal driving conditions will therefore vary rapidly over a short timescales (e.g. over tenths of a second to seconds) as the vehicle 1 rides over the road surface. However, when the vehicle 1 becomes airborne the bumps and irregularities in the road surface will not be communicated to the vehicle 1 (in the case of the vehicle 1 being partially airborne, the bumps and irregularities will be communicated to only some of the wheels) and so the changes in vertical acceleration over short timescales will be greatly reduced. This, in combination with a significant vertical acceleration, is also an indication that at least some of the vehicle's wheels 3, 4 are no longer in contact with the surface 17.

If the vehicle 1 drives over a sharp edge, the surface on which the vehicle 1 is driving effectively drops away suddenly from the vehicle 1, causing the front wheels 3 and then the rear wheels 4 of the vehicle 1 to leave the surface. However, in other situations the vehicle 1 may encounter a bump or other raised feature in the surface, for instance a speed bump, which may cause the vehicle 1 to become airborne. In this instance, the vehicle 1 will experience a sharp upward vertical acceleration, followed by a downward vertical acceleration indicative of being airborne, and once again this will be a reliable indicator that least some of the wheels 3, 4 of the vehicle 1 have lost contact with the surface.

The above first embodiment uses vertical acceleration as the primary indicator of whether the vehicle 1 is airborne.

In preferred embodiments of the invention the vehicle sensors 5 include a longitudinal acceleration sensor, and preferably also a lateral acceleration sensor. When the vehicle 1 is airborne, the wheels 3, 4 of the vehicle 1 will not be able to apply an acceleration, braking or turning force to the vehicle 1. The longitudinal and lateral acceleration of the vehicle 1 will therefore be low when the vehicle 1 is airborne. In some embodiments, a determination may be made that the vehicle 1 is airborne if the vertical acceleration of the vehicle 1 exceeds a threshold and also the longitudinal and/or lateral acceleration of the vehicle 1 is below a further threshold, which may for example be around 2 or 3 m/s$^2$.

In addition, when the vehicle is airborne the rate of roll is likely to be low. Therefore, signals from a roll inertial sensor may be used in confirming a determination that the vehicle 1 is airborne.

In alternative embodiments, a determination is made as to whether the vehicle 1 is airborne by comparing the vertical acceleration against a threshold. However, if the longitudinal acceleration is below a threshold then the threshold against which the vertical acceleration is measured may be reduced.

In a second embodiment of the invention, the vehicle sensors 5 include a pitch sensor, which measures the pitch rate of the vehicle 1. In the second embodiment a longitudinal acceleration sensor is again provided.

Under normal driving conditions, such as shown in FIG. 1, the pitch rate of the vehicle 1 is correlated with the longitudinal acceleration of the vehicle 1. If the vehicle 1 accelerates in a forward direction, the nose of the vehicle 1 will tend to rise. Conversely, if a braking force is applied to the vehicle 1, the nose of the vehicle 1 will tend to dip.

The vehicle will also experience changes in pitch as the vehicle negotiates hills, ramps and speed bumps. However, the rate of pitch associated with these events will be relatively low.

If the vehicle 1 becomes airborne, however, it is likely that the rate of pitch experienced by the vehicle 1 will be relatively high. In addition to this, the rate of pitch will be substantially not correlated with the longitudinal acceleration experienced by the vehicle 1. Also, as discussed above, while the vehicle 1 is airborne it is likely that the vehicle 1 will experience very low longitudinal acceleration. Therefore, a sharp rate of pitch of the vehicle 1, coupled with low longitudinal acceleration, is a reliable indicator that the vehicle 1 is totally or partially airborne. The rate of pitch that will indicate that the vehicle 1 is airborne may vary between different types of vehicle.

In some embodiments, a rate of pitch above a threshold may lead to a determination that the vehicle 1 is airborne.

In other embodiments a determination is made that the vehicle 1 is airborne if the pitch rate is above a certain threshold, and the pitch rate is substantially not correlated with the longitudinal acceleration of the vehicle 1.

In further embodiments a determination is made that the vehicle 1 is airborne if the pitch rate is above a certain threshold and the longitudinal acceleration is below a certain threshold.

In the first embodiments of the invention discussed above, a pitch sensor is preferably not provided. However, a pitch sensor may alternatively be used with these embodiments.

In the second embodiment discussed above, a vertical acceleration sensor is preferably not used. However, in alternative embodiments, a vertical acceleration sensor may be provided.

Elements of the first and second embodiments may be combined, and for instance a determination may be made that the vehicle 1 is airborne if the vehicle 1 experiences a high vertical acceleration, and the rate of pitch exceeds a threshold, and the longitudinal acceleration is below a threshold. Combining indications in this manner will help to reduce the possibility of the control unit 11 making either a "false positive" or "false negative" determination that the vehicle 1 is airborne.

It will be understood that the embodiments discussed above are useful in determining whether the pair of front wheels 3, and/or the pair of rear wheels 4, have lost contact with the surface 17 (as opposed to two wheels on the same side of the vehicle 1 leaving the surface 4 at the same time, for instance in a sharp turn or roll-over situation).

In embodiments of the invention the control unit 11 confirms a determination that the vehicle 1 is travelling over rough terrain, or is entering a ditch, or is airborne, by monitoring the outputs from the various sensors. If the conditions indicating that any of these situation is occurring, continue for a predetermined length of time, which may for example be around 200 ms, the determination will be confirmed.

For a confirmed determination that the vehicle 1 is travelling over rough terrain, or is entering a ditch, or is airborne, other factors can be taken into account in addition, or as an alternative, to the factors discussed above. Examples are given below of ways in which a determination that the vehicle 1 is airborne may be confirmed.

In preferred embodiments of the invention, the vehicle sensors include a lateral acceleration sensor 5. While the vehicle 1 is airborne the lateral acceleration is likely to be very low. If the lateral acceleration experienced by the vehicle 1 remains less than a threshold over the time period in question, this is an indication that the vehicle 1 is airborne.

In further embodiments, the vehicle sensors may include a roll sensor, which detects the rate of roll of the vehicle 1. If the rate of roll is higher than a predetermined threshold over the time period in question, this would also indicate that the vehicle 1 is airborne.

In addition to the above, the roll rate experienced by the vehicle 1 will, in normal driving conditions, generally be correlated with the lateral acceleration experienced by the vehicle 1. If the vehicle 1 performs a sharp left-hand turn, the vehicle 1 will roll to the right, and vice versa. However, if the rate of roll of the vehicle 1 is above a threshold over the time period in question, and this rate of roll is substantially not correlated with the lateral acceleration experienced by the vehicle 1, then this is generally a reliable indicator that the vehicle 1 is airborne.

In preferred embodiments of the invention, only inertial sensors are used to make a determination as to whether the vehicle 1 is airborne. This is preferred because the majority of modern vehicles include these sensors, and therefore a reliable determination can be made based on the available information without the requirement for additional sensors to be installed. In some embodiments of the invention, only inertial sensors are used to determine whether the vehicle 1 is airborne.

Other indicators may also be used. For instance, the control unit 11 may be connected to receive signals from pedal sensors 8 of the vehicle 1. If one or both of the brake and/or accelerator pedals is depressed, but there is no corresponding change in longitudinal acceleration of the vehicle 1, this is a reliable indication that at least the drive wheels of the vehicle 1 are not in contact with the surface 17, and therefore that the vehicle 1 is airborne.

The control unit 11 may also be connected to receive signals from the wheel rotation sensors 6. If the driver accelerates or brakes then the wheel speeds may increase or decrease sharply. If this is not accompanied by a corresponding change in the longitudinal acceleration of the vehicle 1 (or in the longitudinal speed of the vehicle, e.g. as measured by a GPS system), this will once again be an indicator that the wheels 3, 4 in question are not in contact with the surface 17, and that the vehicle 1 is airborne.

The control unit 11 may further be connected to receive signals from the steering sensor 10. If the driver turns the steering wheel, and this is not accompanied by a lateral acceleration/change of direction of the vehicle 1, this will indicate that at least the wheels of the vehicle 1 that are involved with steering are not in contact with the surface 17.

As discussed above suspension sensors may be provided, to monitor the activity of the suspension associated with the vehicle's wheels 3, 4. For instance, suspension force sensors 9 may be used. If a wheel of the vehicle 1 leaves the surface 17, the forces acting on the suspension associated with that wheel will drop to zero, or a very low level, and this can be used to help reach determination that the vehicle 1 is airborne. Alternatively, suspension height sensors may be provided. It will be understood that if a wheel of the vehicle 1 leaves the ground then the effective height of the vehicle above the wheel will increase, and once again this will provide an indication that the vehicle 1 is airborne. Either of the above may apply to active or passive suspension systems. It is also envisaged that the sensors need not be located directly on the components of the suspension systems. For instance, in some active suspension systems sensors may be located within the tires of the vehicle 1, and may measure parameters such as pressure, vertical load and acceleration along one, two, three or more axes. Such sensors may transmit information to the vehicle's systems, and this information can then be used in the control of the active suspension system.

By using inputs from a greater number of different sensors, a more accurate determination can be reached that the vehicle 1 is airborne. It is therefore preferred to use inputs from as many available sensors as possible, to increase the robustness of the determination process.

In preferred embodiments of the invention, once the control unit 11 makes a confirmed determination that the vehicle 1 is airborne, the control unit 11 proceeds to an assessment of the likely severity of the impact when the vehicle 1 strikes the ground. In preferred embodiments this is achieved by calculating the kinetic energy accumulated by the vehicle 1 while it is airborne. In one embodiment, the energy may be approximated using the following formula:

$$\int_0^\tau M \cdot A \cdot V \cdot \partial \tau$$

Where M is the total mass of the vehicle 1, A is the acceleration of the vehicle 1, V is the vehicle's velocity and r is the time over which the vehicle 1 is airborne. The control unit 11 may estimate the position of the surface 17 relative to the vehicle 1, or may alternatively/additionally rely on vehicle sensors such as one or more forward-facing cameras 18, radar and/or lidar, to sense or estimate the distance to the surface 17, and/or the angle of the surface 17 with respect to the vehicle 1, and hence to predict when the vehicle 1 will strike the surface 17.

The control unit 11 also uses signals from the one or more camera systems 18 and/or reflected radiation systems to analyse the surface around the vehicle 1, and to detect the surface of a road in the vicinity of the vehicle 1. For example, an image gathered by a camera system may be analysed to determine which regions of the image are likely to comprise a road, and which regions are likely to comprise a surrounding non-road surface.

Regions of road surface are likely to be relatively flat, devoid of objects and obstacles and to be of a uniform colour, most likely a black or grey colour. By contrast, surrounding non-road regions are likely to be less flat (i.e. to include greater variation in height), to include a greater number of objects and obstacles (such as trees, lamp posts, buildings, pedestrians, houses etc.) and to display a far greater variation in colour. Regions of road are also likely to have a more uniform albedo than non-road regions.

Many roads are also provided with lines, for instance a central line and left and right side lines. These lines may be painted onto the road surface, and are likely to be of a significantly lighter colour than the main road surface. The lines may be solid or dashed. Detection of the presence of these lines in images gathered by camera systems 9 may assist the control unit 11 in determining the presence and location of the road surface, and the location of the edges of the road surface.

In data gathered by one or more reflected radiation systems, the road surface will (as discussed above) appear to comprise a relatively flat, featureless surface. By contrast surrounding non-road areas will include many more features and objects. Also, the road surface is likely to be at a lower level than the surrounding non-road surface (for example, if a curb or pavement is formed at each side of the road) or at a higher level than the surrounding non-road surface (for example, a country road passing through fairly flat terrain). This change in height is likely to be detectable by a reflected radiation system.

The vehicle 1 may, as discussed above, also include a positioning system 7, such as a GPS system, which provides information on the position of the vehicle 1 on the surface of the Earth. In combination with stored map data, the positioning system may be able to determine whether the vehicle 1 is on the surface of a road. The map data may include the width and direction of the road, as well as its shape (i.e. straight regions of the road, as well as the position, length and curvature of bends in the road).

By using information from the camera system(s) 18 and/or reflected radiation system(s), and potentially also from the positioning system 7, the control unit 11 is able to make a determination as to whether the vehicle 1 is travelling along a road, or whether the vehicle 1 has left the road surface and is travelling over a non-road surface. The skilled reader will understand how this is achieved.

The control unit 11 may also be able to determine whether the vehicle 1 is likely to leave the road surface. For instance, referring to FIG. 6, the vehicle 1 is shown travelling along a road 19 and approaching a sharp left-hand bend at a relatively high speed. A forward camera system of the vehicle 1 gathers images of the terrain ahead of the vehicle 1. From the image data, the control unit 11 may be able to determine that the vehicle 1 is approaching a bend. For instance, the control unit may detect the right-hand edge 20 of the road 19, and determines from the position of this edge 20 that the road 19 ahead of the vehicle 1 curves to the left. Alternatively, or in addition, the control unit 11 may recognise that a first region 21 ahead of the vehicle 1 comprises road surface (from the colour, profile, albedo etc. of the surface), and that a second region 22 beyond the first region 21 comprises non-road terrain.

The control unit 11 then determines whether the vehicle 1 is likely to be able to remain on the road 19 through the curve, or whether the vehicle 1 is likely to leave the road 19. In doing so the control unit 11 may take into account the speed of the vehicle (determined from wheel rotation sensors and/or the positioning system) and also information regarding the coefficient of friction between the road surface and the vehicle's wheels 3, 4 (an example of how this may be estimated is disclosed in U.S. Patent Publication No. 2011/0106458). It will be understood that, if the vehicle 1 is approaching a sharp bend at high speed, and the coefficient of friction between the road and the wheels is low, there is a high risk that the vehicle 1 will not be able to negotiate the bend safely and may leave the road surface.

In determining whether the vehicle 1 is likely to leave the road surface the control unit 11 may also take into account information from the steering sensor 10 and/or one or more pedal sensors 8. The vehicle 1 may include a sensor to monitor eye movement of the driver, and if so information from this sensor may be used. For instance, as the vehicle 1 approaches a left-hand bend, and the driver is paying full attention and preparing to negotiate the bend, the driver's eyes should be directed towards a region of the road ahead of the vehicle, in the direction in which the road curves. If the driver's eyes are pointed in a different direction, indicating that the driver's attention has wandered, or indeed if the driver's eyes are closed, indicating that the driver has fallen asleep, then this may contribute to a determination by the control unit 11 that the vehicle 1 is more likely to leave the road 19.

In order to protect the occupants of the vehicle 1 if a determination is made that any of the road departure situations discussed above are occurring, one or more of the vehicle's safety systems may be activated. Which of the vehicle's safety systems are activated will depend on the type of situation that it determined to be occurring, as will be understood by those skilled in the art.

For each safety system, signals received from one or more of the vehicle's sensors, or quantities derived from these signals (such as the time for which the vehicle 1 is airborne) will be compared against an activation threshold (or respective activation thresholds). In embodiments of the invention, one or more activation thresholds are adjusted from a default value if it is determined that the vehicle has left the road, or that the vehicle is likely to do so. It is preferred that, if such a determination is made, the one or more activation thresholds are adjusted so that the safety system(s) are triggered more readily, and/or in a shorter time, than is the case with the default value.

This adjustment of one or more activation thresholds helps to distinguish between circumstances in which the vehicle 1 is driving along a rough road, in which case a hazardous event is relatively unlikely, and in which the vehicle 1 has left the road and encountered uneven non-road terrain, in which case a hazardous event is significantly more likely.

In the example of a "rough terrain" event, in general the activation of a seat belt pretensioner and both front and side air-bags may be desirable to protect an occupant fully from the forces arising from the vehicle travelling at speed over rough terrain. However, depending upon the severity of the forces experienced, it may be appropriate to activate only some of these systems.

For each safety system, a default threshold may be set, and if it is determined that the vehicle 1 has not left, and is not likely to leave, the road, activation of the safety system will take place if the one or more sensor signals (or quantities derived from sensor signals) exceed the default threshold. An adjusted threshold may also be set, which is applied where it is determined that the vehicle 1 has left, or is likely to leave, the road. The application of the adjusted threshold will lead to the safety system being activated more swiftly and/or more readily than is the case for the default threshold.

Where the safety systems are to be activated in response to large acceleration forces, and signals from accelerometers are compared against either the default or the adjusted threshold, the adjusted threshold will generally be lower than the default threshold.

If it is determined that the vehicle 1 is entering a ditch 15, the likely severity of the event may be estimated by considering the difference between the force experienced by the front suspension sensors 9 as compared with the force experienced by the rear suspension sensors 9. This metric may be considered in combination with the level of acceleration experienced by the roll and/or pitch inertia sensors 5. A skilled person will appreciate that there are further ways in which the severity of the situation may be reliably estimated.

In preferred embodiments the difference between the force experienced by the front suspension sensors 9 as compared with the force experienced by the rear suspension sensors 9 may be compared to a default threshold, if the control unit 11 determines that the vehicle 1 has not left, and is not likely to leave, the road. However, an adjusted, lower threshold may be applied if it is determined that the vehicle 1 has left the road, or is likely to do so. A front air-bag and a seat-belt pretensioner may, for example, be activated if the difference in force exceeds the appropriate threshold.

The situation where a vehicle is determined to be airborne will now be described.

In some embodiments of the invention, a reversible seatbelt pretensioner will be activated whenever the control unit 11 makes a confirmed determination that the vehicle 1 is airborne. In some embodiments an irreversible seatbelt pretensioner may be activated as soon as a confirmed determination is made that the vehicle 1 is airborne, if it is determined that the vehicle 1 has left the road, or is likely to do so. However, in the absence of such a determination this is not preferred.

In other embodiments, an irreversible seatbelt pretensioner is activated when a confirmed determination is made that the vehicle 1 is airborne, and the likely severity of the impact when the vehicle 1 meets the surface 17 is above a certain threshold (i.e. the energy accumulated by the vehicle 1 exceeds a threshold). There may be a default threshold, applied if the control unit 11 determines that the vehicle 1 has not left, and is not likely to leave, the road. However, an adjusted, lower threshold may be applied if it is determined that the vehicle 1 has left the road, or is likely to do so.

In embodiments of the invention where a pitch sensor is provided, a seatbelt pretensioner may be activated while the vehicle 1 is airborne if the pitch angle of the vehicle 1 is above a threshold (e.g. if the nose of the vehicle 1 has dipped by more than a predetermined amount), as well as the likely severity of the impact when the vehicle 1 meets the surface 17. Clearly, if the vehicle 1 tilts forward then it is important to ensure that the occupant is pulled back against the seat in preparation for the vehicle 1 striking the surface 17. Once again, both default and adjusted thresholds may be set, depending on whether the control unit 11 determines that the vehicle has left, or is likely to leave, the road.

In yet further embodiments, a reversible or irreversible seatbelt pretensioner is activated when a confirmed determination is made that the vehicle 1 is airborne, and the vehicle sensors then indicate that the vehicle 1 has struck the ground.

It is likely that the vehicle 1 will have a front air-bag positioned in front of at least one occupant. Typically, this air-bag will be triggered if the longitudinal acceleration experienced by the vehicle exceeds a predetermined threshold. In some embodiments, if a confirmed determination is made that the vehicle 1 is airborne, this threshold may be reduced, so that the front air-bag is triggered readily when the vehicle strikes the ground. As above, this threshold may be reduced still further if it is determined that the vehicle 1 has left, or is likely to leave, the road.

In some embodiments the vehicle's sensors may include one or more out of position sensors. These sensors may comprise one or more infrared beam generators and detectors located within the vehicle cabin, to detect the position of the occupant. If the occupant is out of position (for instance, leaning forward) it is additionally important for a seatbelt pretensioner to be activated, to pull the seat occupant into the correct position before the vehicle 1 strikes the ground. Not only will this help minimise injuries as the vehicle 1 strikes the ground, but if a front air-bag is to be triggered then there is a risk of serious injuries to the vehicle occupant if the occupant is leaning forward as the air-bag is activated.

In preferred embodiments the control unit 11 is operable, once a confirmed determination has been made that the vehicle 1 is airborne, to estimate the forces that will arise when the vehicle 1 strikes the surface 17, and hence to work out whether the air-bag will be triggered when the vehicle 1 strikes the surface 4. A first, default, force threshold may be applied if the control unit 11 determines that the vehicle has not left, and is not likely to leave, the road, and an adjusted, lower threshold may be applied if it is determined that the vehicle 1 has left, or is likely to leave, the road.

A seat belt pretensioner (preferably an irreversible pretensioner) may be activated while the vehicle is still airborne if it is predicted that the air-bag will be triggered upon impact. In further embodiments, the pretensioner will additionally only be activated if it is determined that the occupant is out of position.

The description above relates to a four-wheeled vehicle, with a front pair of wheels and a rear pair of wheels. However, a skilled person will appreciate that the invention may apply equally to vehicles with different numbers of wheels, for instance a three-wheeled vehicle having one pair of wheels at the front or rear of the vehicle, and a single wheel at the other of the front and rear. In general, the invention applies to vehicles having a front wheel arrangement and a rear wheel arrangement, where each wheel arrangement has one or more wheels and at least one of the wheel arrangements comprises a pair of front wheels or a pair of rear wheels. If there are two or more wheels in a front or rear wheel arrangement, these wheels are generally aligned with one another in a direction perpendicular to the normal forward direction of travel of the vehicle, but need not be connected by a common axle. The front wheel arrangement is spaced apart from the rear wheel arrangement, in a direction generally parallel with the normal forward direction of travel of the vehicle.

In some embodiments of the invention, sensors other than inertial sensors (e.g. some or all of the non-inertial sensors discussed above) are used to determine whether the vehicle 1 is airborne, and no inputs from inertial sensors are used to reach a determination as to whether the vehicle 1 is airborne.

It will be appreciated that embodiments of the present invention provide a robust and reliable system for indicating whether a vehicle may be involved in a potentially dangerous situation, and to assist in deploying appropriate safety measures if such a determination is made.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof

The invention claimed is:

1. A safety arrangement for a vehicle, the arrangement comprising:
   a control unit;
   one or more vehicle sensors, the sensors being connected to the control unit so the control unit receives output signals from the sensors;
   a road detection arrangement to detect a surface or an edge of a road in a vicinity of the vehicle and determine whether the vehicle has left the road and is being driven over a surrounding non-road surface; and
   one or more vehicle safety systems which may be activated by the control unit,
   wherein:
   the control unit is configured to process the signals received from the sensors and to determine, based on a vertical acceleration, whether the vehicle is airborne, wherein the vehicle has a front wheel arrangement having one or more wheels and a rear wheel arrangement having one or more wheels, and the control unit is configured to determine that the vehicle is airborne if it is determined that at least one of the wheel arrangements is not in contact with a surface over which the vehicle is being driven;
   the control unit is configured to activate the one or more vehicle safety systems if it is determined from the signals received from the sensors that the vehicle is airborne;
   signals from the sensors, or one or more quantities derived or calculated from signals from the sensors, are compared against at least one threshold to determine whether to activate the one or more vehicle safety systems, wherein the threshold is set at a first level if it is determined by the road detection arrangement that the vehicle has not left the road, and at a second level if it is determined that the vehicle has left the road; and
   when the second level of the threshold is applied, the one or more safety systems are activated more rapidly than is the case when the first level of the threshold is applied.

2. The safety arrangement according to claim 1, wherein the sensors are inertial sensors.

3. The safety arrangement according claim 1 wherein one of the at least one threshold is an energy or speed threshold and, if a determination is made that the vehicle is airborne, an estimated energy or speed of impact when the vehicle ceases to be airborne is determined by the control unit and compared against the threshold, and wherein the second value of the threshold is lower than the first value of the threshold.

4. The safety arrangement according to claim 1 wherein one of the at least one threshold is a time threshold and, if a determination is made that the vehicle is airborne, a time for which the vehicle is airborne is compared against the threshold, and the second value of the threshold is lower than the first value of the threshold.

5. The safety arrangement according to claim 1 wherein one of the at least one threshold is a pitch threshold and a rate or degree of pitch of the vehicle is compared against the threshold, and the second value of the threshold is lower than the first value of the threshold.

6. The safety arrangement according to claim 1, wherein one of the at least one threshold is a roll threshold and a rate or degree of roll of the vehicle is compared against the threshold, and the second level of the threshold is lower than the first level of the threshold.

7. The safety arrangement according to claim 1, wherein one of the at least one threshold is a yaw threshold and a rate or degree of yaw of the vehicle is compared against the threshold, and the second value of the threshold is lower than the first value of the threshold.

8. The safety arrangement according to claim 1, wherein the road detection arrangement is configured to detect an edge of a road along which the vehicle is traveling.

9. The safety arrangement according to claim 1 wherein the road detection arrangement comprises at least one of a camera and a reflected radiation system.

10. The safety arrangement according to claim 1 wherein the road detection arrangement comprises a positioning system.

11. The safety arrangement according to claim 1 wherein the one or more vehicle safety systems comprise at least one of an air bag and a seatbelt pretensioner.

12. A vehicle comprising the safety arrangement according to claim 1.

* * * * *